United States Patent Office 2,801,928
Patented Aug. 6, 1957

2,801,928
STABILIZATION OF FATTY MATERIALS

Ralph B. Thompson and Ted Symon, Hinsdale, Ill., assignors to Universal Oil Products Company, Des Plaines, Ill., a corporation of Delaware No Drawing. Application November 25, 1953,
Serial No. 394,518
9 Claims. (Cl. 99—163)

The invention relates to the stabilization of fatty materials, including edible fats and oils, which may be of animal, vegetable or mineral origin and which tend to become rancid, especially during long periods of storage prior to use. Typical representatives of the edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. It is understood that other oils and fats may be treated within the scope of the present invention, including oils and fats which previously have been subjected to various treatments such as hydrogenation, blowing with air, heat treatment, etc.

In one embodiment the present invention relates to the stabilization of a fatty material against deterioration by incorporating therein an inhibitor comprising a hydroquinone compound having a 5-membered ring fused to the aromatic nucleus and having the structure of a methano-tetrahydronaphthalene.

In a specific embodiment the present invention relates to the stabilization of fatty materials and particularly lard by incorporating therein from about 0.0001% to about 1% by weight of 1,4-dihydroxy-5,8-methano-5,6,7,8-tetrahydronaphthalene.

The novel inhibitors of the present invention, comprising a hydroquinone compound having a 5-membered ring fused to the aromatic nucleus and having the structure of methano-tetrahydronaphthalenes, are illustrated by the following general formula:

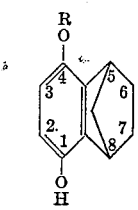

in which R represents hydrogen or a hydrocarbon group such as alkyl, alkenyl, cycloalkyl, cycloalkalkyl, alkcycloalkyl, aryl, aralkyl, alkaryl, etc. where R is hydrogen, the inhibitor will comprise 1,4-dihydroxy-5,8-methano-5,6,7,8-tetrahydronaphthalene which is a particularly preferred inhibitor for use in accordance with the present invention. Where R comprises an alkyl radical, the compound may comprise 1-hydroxy-4-methoxy-5,8-methano-5,6,7,8 - tetrahydronaphthalene, 1 - hydroxy - 4 - ethoxy-5,8 - methano - 5,6,7,8 - tetrahydronaphthalene, 1 - hydroxy - 4 - propoxy - 5,8 - methano - 5,6,7,8 - tetrahydronaphthalene, 1 - hydroxy - 4 - butoxy - 5,8 - methano-5,6,7,8 - tetrahydronaphthalene, 1 - hydroxy - 4 - pentoxy-5,8-methano-5,6,7,8-tetrahydronaphthalene, 1-hydroxy - 4-hexoxy-5,8 - methano-5,6,7,8 - tetrahydronaphthalene, etc. Where R is an aryl group the compound may comprise 1 - hydroxy - 4 - phenoxy - 5,8 - methano - 5,6,7,8 - tetrahydronaphthalene, 1 - hydroxy - 4 - tolyoxy - 5,8-methano-5,6,7,8 - tetrahydronaphthalene, 1 - hydroxy - 4 - xyloxy-5,8 - methano - 5,6,7,8-tetrahydronaphthalene, 1-hydroxy-4-benzyloxy - 5,8 - methano - 5,6,7,8 - tetrahydronaphthalene, etc.

The inhibitor compound of the present invention generally is incorporated in the organic material to be stabilized in an amount of not above about 2% and usually in an amount within the range of from about 0.0001% to about 1% by weight. When used in edible fats and oils, it is understood that the inhibitor compound may be utilized in conjunction with synergists such as citric acid, phosphoric acid, ascorbic acid, etc., and/or in combination with other inhibitors and/or other compounds added for specific purposes. The inhibitor of the present invention may be utilized as such or in a suitable solvent, including hydrocarbons, alcohols, glycols, ethers, ketones, etc. When desired, the inhibitor compound may be marketed as a solution along with one or more other additives to be incorporated in the organic material.

The following examples are introduced to illustrate further the novelty and utility of the present invention but not with the intention of unduly limiting the same.

*Example I*

The lard used in this example had a normal stability period of 4 hours as determined by the Swift test. This test is described in detail in the article by A. E. King, H. L. Roschen and W. H. Irwin, which appeared in "Oil and Soap," vol. X, No. 6, pages 105–109 (1933), and modified as described in the article by R. W. Reimenschneider, J. Turer and R. M. Spec, which appeared in "Oil and Soap," pages 169–171 (September 1943). In general this test comprises bubbling air through a sample of lard and determining rancidity organoleptically and by peroxide numbers. The result of these tests is reported as A. O. M. stability period, which is the number of hours required to reach a peroxide number of 20.

To a sample of the lard described above, 0.02% by weight of 1,4-dihydroxy-5,8-methano-5,6,7,8-tetrahydronaphthalene was added. This served to increase the stability period of the lard to 61.5 hours.

*Example II*

0.02% by weight of 1-hydroxy-4-methoxy-5,8-methano-5,6,7,8-tetrahydronaphthalene was incorporated in another sample of the lard described in Example I and this served to increase the stability period of the lard to 33 hours.

*Example III*

This example illustrates the unexpected higher potency of the methano-tetrahydronaphthalene in comparison with the results obtained when using hydroxy-tetrahydronaphthalenes.

0.02% by weight of 5,6,7,8-tetrahydro-1-naphthol was added to another sample of the lard described in Example I and this compound increased the induction period thereof to less than 5.5 hours. 0.02% by weight of 1,4-dihydroxy-5,6,7,8-tetrahydronaphthalene, when incorporated in another sample of the lard described in Example I, increased the stability period thereof to only 8 hours. This example illustrates the necessity of hydroquinone structure having a 5-membered ring fused to the aromatic nucleus.

We claim as our invention:

1. Fatty material normally subject to oxidative deterioration containing a stabilizing amount of a compound of the following general formula:

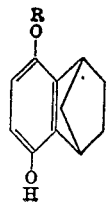

in which R is selected from the group consisting of hydrogen and hydrocarbon radicals.

2. Method of stabilizing a fatty material against rancidity which comprises incorporating therein from about 0.0001% to about 1% by weight of a 1,4-dihydroxy-5,8-methano-5,6,7,8-tetrahydronaphthalene.

3. Method of stabilizing lard against rancidity which comprises incorporating therein from about 0.0001% to about 1% by weight of 1,4-dihydroxy-5,8-methano-5,6,7,8-tetrahydronaphthalene.

4. Method of stabilizing a fatty material against rancidity which comprises incorporating therein from about 0.0001% to about 1% by weight of a 1-hydroxy-4-alkoxy-5,8-methano-5,6,7,8-tetrahydronaphthalene.

5. Fatty material subject to oxidative deterioration containing a stabilizing amount of a 1,4-dihydroxy-5,8-methano-5,6,7,8-tetrahydronaphthalene.

6. Fatty material subject to oxidative deterioration containing a stabilizing amount of a 1-hydroxy-4-alkoxy-5,8-methano-5,6,7,8-tetrahydronaphthalene.

7. Fatty material subject to rancidity containing, as an inhibitor to retard said rancidity, from about 0.0001% to about 1% by weight of 1,4-dihydroxy-5,8-methano-5,6,7,8-tetrahydronaphthalene.

8. Fatty material subject to rancidity containing, as an inhibitor to retard said rancidity, from about 0.0001% to about 1% by weight of 1-hydroxy-4-methoxy-5,8-methano-5,6,7,8-tetrahydronaphthalene.

9. Lard normally tending to become rancid containing from about 0.0001% to about 1% by weight of 1,4-dihydroxy-5,8-methano-5,6,7,8-tetrahydronaphthalene.

References Cited in the file of this patent
UNITED STATES PATENTS

| | | |
|---|---|---|
| 2,110,950 | Burk et al. | Mar. 15, 1938 |
| 2,176,881 | Burroughs | Oct. 24, 1939 |
| 2,176,883 | Fisher | Oct. 24, 1939 |
| 2,692,202 | Chenicek et al. | Oct. 19, 1954 |